United States Patent Office 3,473,906
Patented Oct. 21, 1969

3,473,906
METHOD OF STRENGTHENING GLASS
Paul W. L. Graham, Toledo, Ohio, assignor to Owens-Illinois, Inc., a corporation of Ohio
No Drawing. Filed Dec. 23, 1966, Ser. No. 604,169
Int. Cl. C03b 25/00
U.S. Cl. 65—30                                     9 Claims

ABSTRACT OF THE DISCLOSURE

Processes for making glass articles such as containers and improving the strength thereof by forming a container at the forming station, applying to the outer surface of the newly formed containers an aqueous solution of $K_2HPO_4$, transferring the coated bottle to an annealing station to provide an ion exchange of the potassium ions in the aqueous solution for the alkali metal ions in the glass to thereby provide a strengthened container.

---

This invention relates to a method of increasing the mechanical strength of glass articles. More particularly, the present invention pertains to a method of strengthening silicate glass containing alkali oxides through a chemical tempering process.

In divising methods of increasing the strength of glass articles, two basic factors must be considered: (1) glass always fails in tension stress, and (2) glass fractures generally originate at the surface. Accordingly, presently known methods of strengthening glass articles are based on the formation of a compressive stress layer at the surface of the article. In theory then, before fracture can occur, the compressive stress must be overcome. For example, if a surface compressive stress of 20,000 p.s.i were present, the strength of the body would theoretically be increased by 20,000 p.s.i., in the absence of other factors. Unfortunately, this simple relationship does not always control, and other variables such as geometry of the glass article, and the presence of surface flaws and defects, often cause additional problems.

Methods of strengthening glass articles by effectuating a permanent surface compressive stress are known in the art. In one such process known as thermal tempering, rapid quenching of the hot glass article establishes high surface compression counter-balanced by high interior tension which results in increased strength as long as the compression layer is not penetrated. While this process is quite economical, there are several practical limitations. For instance, since the amount of permanent compressive surface stress (and therefore the strength increase) is proportional to the temperature gradient that can be induced throughout the cross section of the article under non-equilibrium conditions, there are several processing difficulties. As a practical matter, then it is difficult to achieve surface compressive stresses over about 25,000 p.s.i. using such thermal techniques. Since the strengthening effect is proportional to the amount a surface compressive stress that can be generated, the amount of strengthening realized is effectively limited.

Consequently, other means for inducing permanent surface compressive stresses were developed, and to a certain extent have become known in the art.

Generally, these methods comprise inducing surface compressive stress through thermo-chemical rather than physical means. In the simplest expression of this technique, alkali ions in the glass surface are replaced by a different alkali ion from an external source. The relative sizes of the alkali ion exchange pairs are preselected so that the ion exchanged surface layer of the glass article will be in compression when the treated glass article is cooled to room temperature.

The above process has been practiced at least experimentally, in two distinct methods of application. In one method described in U.S. Patent No. 2,779,136 the alkali ion from the external source is lithium, the alkali ion in the glass is sodium, and the ion exchange is carried out at a temperature that is above the strain point and below the softening temperature of the glass to produce a glass surface layer that will be in compression and the main body of the glass in tension when the glass article is cooled to room temperature. This process requires a relatively high processing temperature which is well over 1000° F. for ordinary glasses. Additionally, a source of lithium ion is required, and generally speaking, lithium is the most expensive alkali metal of the group of potassium, sodium and lithium. Another method of application is utilized in U.S. patent application Ser. No. 228,255, filed Oct. 4, 1962, now Patent Number 3,287,200 on which French Patent 1,375,995 is based. Therein is disclosed a method of exchanging sodium ions in ordinary soda-lime-silica glass with potassium ions from an external source at temperatures below the strain point of the glass so as to generate a compressive stress at the surface, and tension stresses in the interior of the glass article. When a larger alkali metal ion replaces a smaller alkali metal ion in the surface layer of glass at a temperature that is below the strain point of the glass, the surface layer then has a compressional or compressive stress. Apparently, the larger ions try to occupy the smaller spaces previously occupied by the smaller alkali metal ions, thereby creating the compressional stress in the surface layer. Because the temperature of the glass is below the strain point, the glass structure cannot readjust itself to relieve the stress.

While this method generates substantial surface stress, it is somewhat commercially impractical in that it is necessary to immerse the article to be strengthened for substantial time periods in a molten salt bath containing the larger alkali metal ion to be diffused into the glass. Accordingly, the need exists for an economical method for integrating ion exchange techniques into existing processes for forming and annealing commercial glass articles.

In copending application Ser. No. 529,215, filed Feb. 23, 1966 (assigned to the present assignee) such a method is disclosed. One feature of this method includes the spraying of an aqueous ion exchange medium on the glass article to be strengthened followed by a heat treatment to effectuate the ion exchange. In this application, an aqueous solution of potassium carbonate is one of the preferred ion exchange species with respect to soda glass. It is also disclosed that an etching or "hazing" of the glass is observed under certain conditions when potassium carbonate is used as the ion source. This etch or haze is shown to be removable by washing in dilute nitric acid. This acid wash step adds to the manufacturing cost and is therefore undesirable.

In view of the above, it is an object of the present invention to provide a method of strengthening a soda glass article that uses an alkali metal salt as the ion exchange medium, but does not require that the alkali metal salt, alone or admixed with other salts, be in molten form to replace another alkali metal ion in the surface layer of the glass.

It is a further object of this invention to provide a process of strengthening glass without detracting from its physical appearance wherein a solid coating of an ion exchange salt is applied by means of vaporizing the water from a concentrated aqueous solution of the ion exchange salt in the vicinity of the article to be treated to deposit a uniform coating on the glass.

Another object of the present invention is to provide a process of strengthening silicate glasses containing $Na_2O$ in which a hot, freshly formed glass article, prior to its annealing, is contacted with a fluid ion exchange medium to provide an alkali metal salt as a coating on the glass in a preselected surface area so that the surface can be ion exchanged by alkali metal ions of the salt with alkali metal ions of the glass during annealing of the glass article.

A further object is to provide an economical method of strengthening soda containing glass compositions through a potassium for sodium ion exchange process utilizing aqueous solutions of dipotassium hydrogen orthophosphate.

Another object of the present invention to to provide a new and practical method of contacting a potassium ion source with a glass containing soda for the purpose of strengthening the glass through an ion exchange process.

Yet another object of the present invention is to provide a method of chemically tempering ordinary soda-lime-silica glass during the annealing cycle with an ion exchange medium that significantly strengthens the finished glass article without detracting from its physical appearance.

In attaining the objects of this invention one feature resides in the application of an aqueous solution of dipotassium hydrogen orthophosphate to a soda glass article at temperatures sufficient to vaporize the water and thereby deposit the potassium salt as a coating on the article, maintaining the article at an elevated temperature for a period of time sufficient for some of the potassium ions in the salt to diffuse into the glass and thereby create a surface compressive stress.

The above and other objects, features and advantages of the present invention will become more apparent from the following description and claims.

It is stated above that the present invention can be practiced in conjunction with soda or soda silicate glasses. These terms refer to silicate glasses containing at least about 2%, preferably at least about 5% by weight of soda ($Na_2O$). Several glass compositional fields suitable for use in practicing the present invention are disclosed in commonly assigned, copending application, Ser. No. 529,215, filed Feb. 23, 1966, the disclosure of which is incorporated herein by reference.

The process of the present invention comprises forming on the surface of an article of glass, containing at least about 2%, preferably at least about 5% by weight of soda, a substantially continuous layer or coating of dipotassium hydrogen orthophosphate; maintaining said surface and said layer of dipotassium hydrogen orthophosphate, at an elevated temperature for a period of time sufficient for some potassium ion to diffuse into and replace a portion of the sodium ion in said glass to provide a compressive stress in said glass; and cooling the glass article to a temperature at which ion exchange doe not occur and removing the layer of potassium salt. The salt layer can be removed prior to or after the completion of the cooling step. The salt can be removed completely by a water wash and no acid treatment is provided.

The elevated temperature maintained in this process for ion exchange is sufficiently below the softening point of the glass to avoid relief of the stress created when the potassium ions replace the sodium ions. The optimum ion exchange temperature is a function of the viscosity of the glass composition utilized in that the rate of ion exchange increases with increasing temperatures while the glass viscosity decreases with the increaing temperatures. At some temperature then, the viscosity will be reduced to the point where the glass structure will yield to accommodate the larger potassium ions as they diffuse into the glassy matrix and thereby relieving the stress.

Usually temperatures more than about 100° F. above the annealing point are undesirable. Temperatures between the strain point and 100° F. above the annealing point may be utilized provided the time period is short enough to preclude substantial stress relaxation (i.e. less than about 30 minutes). Ion exchange temperatures lower than about 300° F. are usually too low to promote the necessary ion diffusion.

When the temperature is below the strain point of the glass being treated, the ion exchange time is between about 5 minutes and about 24 hours with the time varying inversely with the temperature. Usually time periods ranging from about 5 minutes to about 4 hours are employed.

In one particularly important embodiment of the present invention the potassium salt solution is sprayed on the glass article immediately after forming the article to form the coating layer and the elevated temperature necessary for the ion exchange reaction is provided by the normal annealing heat treatment.

As is already known in the art, the time should not be too long; otherwise there will be a diffusion of potassium ions to a greater extent than desired. The time should be long enough, however, to effectuate a compressional stress layer of at least about 10 microns in depth.

According to the present invention, the dipotassium hydrogen orthophosphate ($K_2HPO_4$) is applied to the glass in the form of an aqueous solution having a concentration ranging from about 0.1 to about 1.3 grams of $K_2HPO_4$ per cc. of water. Preferably the concentration is greater than 0.4 gram per cc. of water. The aqueous potassium salt solution should be applied to the glass article at a temperature above the boiling point of water to permit, by one spray application, the formation of the solid layer with sufficient depth to provide enough potassium ion for the desired degree of ion exchange. Usually the glass temperature is above 300° F., and preferably is about 600° F. to about 1100° F. During the spray application, care should be taken to avoid fracturing the glass article in thermal shock.

The terms "strain point," "annealing point," and "softening point" are used above. These terms refer to the glass viscosity and have definitions that are well known in the art. (For instance, see ASTM Test Designation C336–64T.)

The following examples will more specifically define the principle of the present invention although they should not be interpreted by way of limitation.

Example I

The batch materials from the corresponding column of Table I (headed Example I) were melted and refined with mechanical agitation in a platinum crucible under oxidizing conditions in a gas fired furnace at 2900° F. for about 20 hours. Cane was drawn from the homogeneous molten glass after it had melted and refined. The cane samples, having an average diameter of about 0.2 inch, were cut into about 5 inch lengths to make sample rods. Several of these rods were preheated to 700° F. and sprayed with various aqueous solutions of $K_2HPO_4$ and heat treated and tested as set forth below in Table III. The spray apparatus utilized was an atomizing hand-operated spray gun using compressed air as the propellant. The preheated rods were slowly rotated while the $K_2HPO_4$ was sprayed onto the hot rods. As the spray contacted the rods, the water evaporated depositing a uniform coating of the potassium salt on the rods. The spray application required less than 30 seconds to achieve the desired thickness of salt coating. The rods were then heat treated by placing them in a preheated furnace according to the time schedule set forth below in Table III.

Upon completion of the heat treatment the rods were removed from the furnace, cooled to room temperature, and washed with water to remove the adhering salt layer. The treated rods were clear and bright, and had the appearance of untreated glass.

The sample rods were cut into cross sectional pieces and examined by well known optical techniques to determine the depth, type, and degree of stress throughout the cross section. The stress characteristics were measured as a function of birefringence using a graduated quartz wedge (prism) calibrated in millimicrons. Cross sectional pieces of the exchanged rods were cut from the rods using an ordinary circular diamond saw. Such saws are common in the glass industry. The thickness of the cross sectional piece was measured in the direction parallel to the original axis of the rod sample. The measured cross sectional piece was then mounted in matched index fluid (e.g., oil having the same index of refraction as glass) on the stage of a petrographic microscope so that the polarized light would pass through the measured dimension. The polarizer was contained in the optic system below the microscopic stage.

The polarized light passing through the measured cross sectional test piece was received in an eye piece equipped with the calibrated quartz prism. The optic lag (retardation), expressed in terms of millimicrons retardation per unit cross sectional thickness of the test specimen, was then obtained by reading the calibrated prism.

The depth of the stress layer was measured to the neutral stress axis with an eye piece calibrated in microns.

The degree of surface stress was approximated based on the assumption that the stress-optical coefficient for the compositions studied was about 2 pounds/(m$\mu$) (inch). The degree of surface stress reported in Table III is then only an approximation because the stress optical coefficient is known to depend on the glass composition, and there is a compositional gradient established by the ion exchange treatment itself. The calculation, then, expressing the degree of stress can be expressed as follows:

Stress in p.s.i.=optical retardation (m$\mu$/inch)×stress optical coefficient (2 pounds/m$\mu$ inch).

The treated sample rods were tested with and without prior abrasion to determine their modulus of rupture.

The abrasion method consists of tumbling several sample rods for 15 minutes in a ball mill in intimate contact with number 30 grit silicon carbide. This is a very severe abrading condition and is more drastic than the abuse encountered in most commercial applications.

The flexural strengths (modulus of rupture) values were determined using a Tinius-Olson testing machine. This machine applied a measured load through two knife edges spaced ½ inch apart, to the center of the sample rod supported on two knife edges 4½ inches apart (4-point loading). The load is applied at a constant rate of 24 pounds per minute until failure occurs, with a marker indicating the highest load applied to the point of failure. A dial micrometer calibrated in inches and equipped with a bar contact instead of a point contact, is used to measure the maximum and minimum diameters at the center of the sample to an accuracy of 0.0005 inch. Since few cane samples are perfectly round, the load is applied normal to the maximum diameter and the standard formula for an elliptical cross section is used in calculating the modulus of rupture (MR) as follows:

$$MR = \frac{\text{Load (lbs.)} \times 8 \times \text{span (in.)}}{(D_1^2 \times D_2)\pi}$$

The modulus of rupture in this formula gives the flexural strength in pounds per square inch of cross sectional area at failure. The results of these tests are reported in Table III. For the purposes of comparison, the five glasses listed in these tables without any ion exchange treatment would have modulus of rupture values of about 10,000–12,000 p.s.i. after being subjected to the abrasion method described above.

To further demonstrate the principles of the present invention, the various glass compositions described in the tables under the columns headed Example II, Example III and Example IV, were prepared and treated according to the methods of Example I. These examples illustrate the applicability of this invention to a wide range of ion exchangeable glass compositions. Examples I and III are soda aluminosilicate compositions, Example II is a soda magnesia silicate composition while Example IV is a soda-lime silica composition.

The properties, compositions and results are listed in Tables I, II and III, the performance of an ordinary soda-lime-silica glass is included in Example IV because of its commercial importance.

TABLE I.—BATCH MATERIALS FOR EXEMPLARY GLASSES

| Material | Ex. I | Ex. II | Ex. III |
|---|---|---|---|
| Nepheline syenite | 3,826.6 | 635.6 | |
| Periclase | 104.3 | 511.2 | |
| Sand (99.5+ SiO$_2$) | 667.3 | 3,213.2 | 2,090.0 |
| Sodium borate (anhydrous) | 256.2 | | |
| Soda Ash | 318.6 | 1,144.7 | 910.5 |
| Alumina (99.5+ Al$_2$O$_3$) | 0.5 | | 887.3 |
| Sodium Antimonate | | | 47.4 |

TABLE II.—THEORETICAL COMPOSITION AND PROPERTIES OF EXEMPLARY GLASSES

| Constituent | Example I | Example II | Example III |
|---|---|---|---|
| Percent: | | | |
| SiO$_2$ | 59.4 | 71.8 | 59.5 |
| Al$_2$O$_3$ | 18.0 | 3.0 | 25.2 |
| MgO | 2.0 | 10.0 | |
| CaO | | | |
| Na$_2$O | 13.2 | 14.6 | 15.3 |
| K$_2$O | 3.7 | 0.6 | |
| Sb$_2$O$_3$ | | | 1.0 |
| B$_2$O$_3$ | 3.5 | | |
| Liquidus (° F.) | <1,725 | 1,765 | <1,985 |
| Log=4 (° F.) | 2,150 | 1,950 | 2,650 |
| Annealing Point, ° F | | | 1,370 |

TABLE III.—SUMMARY OF EXEMPLARY RESULTS

| | Ion Exchange Treatment | | | | | |
|---|---|---|---|---|---|---|
| Example I: | | | | | | |
| Concentration K$_2$HPO$_4$ in water (gm./cc. H$_2$O) | 0.1 | 0.2 | 0.4 | 0.7 | 1.0 | 1.3 |
| Heat treatment temperature (° F.) | 1,025 | 1,025 | 1,025 | 1,025 | 1,025 | 1,025 |
| Heat treatment time (minutes) | 5 | 5 | 5 | 5 | 5 | 5 |
| | Optical Properties of Exchanged Glasses | | | | | |
| Maximum optical retardation in m$\mu$/0.01 inch | 0 | 85 | 260 | 265 | 315 | 265 |
| Approximate surface compressive stress in p.s.i. | 0 | 17,000 | 52,000 | 53,000 | 63,000 | 53,000 |
| Depth of compressive stress in microns | | 19 | 39 | 44 | 42 | 39 |
| | Flexural Strength Modulus of Rupture of Exchanged Glasses in p.s.i. (average of 5 samples) | | | | | |
| Flexural strength (unabraded) | | 16,800 | 52,400 | 48,200 | 49,500 | 48,700 |
| Flexural strength (abraded) | | 9,200 | 16,300 | 13,400 | 18,900 | 13,900 |

TABLE III.—Continued

Example II:

| | Ion Exchange Treatment | | | | | |
|---|---|---|---|---|---|---|
| Concentration K₂HPO₄ in water (gm./cc. H₂O) | 0.1 | 0.2 | 0.4 | 0.7 | 1.0 | 1.3 |
| Heat treatment temperature (° F.) | 980 | 980 | 980 | 980 | 980 | 980 |
| Heat treatment time (minutes) | 5 | 5 | 5 | 5 | 5 | 5 |
| Optical Properties of Exchanged Glasses | | | | | | |
| Maximum optical retardation in mμ/0.01 inch | 0 | 30 | 90 | 90 | 90 | 110 |
| Approximate surface compressive stress in p.s.i. | 0 | 6,000 | 18,000 | 18,000 | 18,000 | 22,000 |
| Depth of compressive stress in microns | | 12 | 20 | 10 | 15 | 21 |
| Flexural Strength Modulus of Rupture of Exchanged Glasses in p.s.i. (average of 5 samples) | | | | | | |
| Flexural strength (unabraded) | 14,900 | 15,400 | 31,500 | 56,500 | 40,900 | 31,200 |
| Flexural strength (abraded) | 6,900 | 8,100 | 11,200 | 13,600 | 10,400 | 15,500 |

Example III:

| | Ion Exchange Treatment | | | | | |
|---|---|---|---|---|---|---|
| Concentration K₂HPO₄ in water (gm./cc. H₂O) | 0.1 | 0.2 | 0.4 | 0.7 | 1.0 | 1.3 |
| Heat treatment temperature (° F.) | 1,030 | 1,030 | 1,030 | 1,030 | 1,030 | 1,030 |
| Heat treatment time (minutes) | 30 | 30 | 30 | 30 | 30 | 30 |
| Optical Properties of Exchanged Glasses | | | | | | |
| Maximum optical retardation in mμ/0.01 inch | 0 | 0 | 80 | 70 | 110 | 160 |
| Approximate surface compressive stress in p.s.i. | | | 16,000 | 14,000 | 22,000 | 32,000 |
| Depth of compressive stress in microns | 0 | 0 | 78 | 62 | 16 | 64 |
| Flexural Strength Modulus of Rupture of Exchanged Glasses in p.s.i. (average of 5 samples) | | | | | | |
| Flexural strength (unabraded) | 16,400 | 19,800 | 40,000 | 35,900 | 52,900 | 44,300 |
| Flexural strength (abraded) | 11,100 | 10,700 | 31,300 | 27,200 | 37,300 | 37,400 |

Example IV

To further demonstrate the principles of the present invention, the ion exchange technique was practiced in conjunction with ordinary soda-lime glass. It should be noted that soda-lime glass of itself has very poor ion exchange properties, but nevertheless, it was possible to achieve ion exchange by the present spray technique that is comparable to the ion exchange achieved by the molten bath technique.

Small soda-lime glass jars of conventional design, similar to those used in packaging baby food, were formed in conventional glass forming equipment and sprayed with an aqueous solution of K₂HPO₄ (1.3 gm. K₂HPO₄/cc. of H₂O) immediately after their formation, and prior to their annealing. The temperature of the jars at the point of application was about 700–900° F. The hot, freshly formed coated jars were then passed through the annealing lehr to receive the normal annealing temperature treatment that untreated bottles receive in their manufacture. A temperature profile in this annealing lehr has been determined using a traveling thermocouple attached to the bottom of a bottle. This temperature profile determination indicates that for about the last one-half of the initial 5 minutes the temperature of the bottom of the bottle was rising from about 980° F. and then in the next 5 minutes the bottom of the bottle was at a temperature between 1000° F. and 1025° F. After the first 10 minutes the temperature decreases. At the end of about 15 minutes overall, the temperature was reduced to 900° F. and at the end of 20 minutes overall it was reduced to about 600° F. followed by still further cooling. The total travel time through the lehr is about 40 minutes. The temperature in the sidewall portion of the bottle passing through the lehr will be ahead of the temperature of the bottom during the heat-up period and will retain that temperature of the bottom during the cooling period.

The glass of these bottles has an annealing point of about 1030° F. and a strain point of 980° F. This glass has the following theoretical composition, expressed as oxides in weight percent:

| | |
|---|---|
| SiO₂ | 72.0 |
| Al₂O₃ | 1.9 |
| CaO | 9.6 |
| MgO | 4.2 |
| Na₂O | 11.5 |
| K₂O | 0.4 |

This is a conventional soda-lime-silica container glass. Its manufacture is described in many places in the literature such as "Handbook of Glass Manufacture" by Tooley, published in 1953. A typical batch composition for this glass is as follows on a weight percent basis:

| | |
|---|---|
| Sand | 57.1 |
| Soda ash | 15.8 |
| High calcite lime | 5.9 |
| Raw dolomite | 14.6 |
| Nepheline syenite | 6.1 |
| Salt cake | 0.5 |

The jars after exiting from the annealing lehr and cooling to room temperature were washed with tap water. The treated jars were clear and bright, and generally had the appearance of untreated jars.

The surface compressive layer of the treated jars was evaluated by the methods described above. A compressive stress layer of about 10 microns in depth with a maximum optical retardation of about 100 mμ/0.01 inch was observed. This is equivalent to a compressive stress of approximately 20,000 p.s.i. A corresponding increase in strength was realized in the treated glass jar.

From the foregoing, it will be appreciated by those skilled in the art that this invention provides a novel method of strengthening glass compositions containing soda, by a potassium ion exchange process which can be readily incorporated into existing commercial glass forming operation.

I claim:

1. In the method of strengthening a glass article, at elevated temperatures, wherein sodium ions in the surface layer of the glass are replaced by potassium ions from an external source, the improvement comprising, applying on the surface of said glass article a substantially continuous coating layer of K₂HPO₄, maintaining the coated glass article at an elevated temperature sufficiently high and from a temperature at about the strain point to a temperature not substantially greater than 100° F. above the annealing point for a period of time less than about 30 minutes to provide a compressive stress surface layer in the glass article, but for a time insufficient to provide ion exchange to a substantial degree in the interior portion of the glass of the article and for a time insufficient to provide substantial stress relaxation of said glass in said surface layer, cooling the glass article to a temperature at which the ion exchange does not occur, removing the potassium salt and thereby producing a clear, haze-free, strengthened glass article.

2. The improvement of claim 1, wherein the glass composition includes at least 2% by weight of soda ($Na_2O$) and the applying of the potassium salt coating layer is by depositing the salt from a water solution of $K_2HPO_4$ containing at least about 0.4 gram of $K_2HPO_4$ per cc. of water and by evaporating the water while in the presence of the glass article to be treated.

3. The improvement of claim 2, wherein the glass article is washed with water to remove the potassium salt layer.

4. The improvement of claim 2, wherein the soda content of the glass composition is greater than about 5% by weight, the applying of the water solution of $K_2HPO_4$ to the glass surface is at a temperature above the boiling point of water, and the concentration of the water solution of $K_2HPO_4$ is from about 0.4 to 1.3 grams of $K_2HPO_4$ per cc. of water.

5. The improvement of claim 4, wherein said coating layer is formed on the glass article by spraying the aqueous $K_2HPO_4$ solution onto said article immediately after forming said article, and the elevated temperature necessary for the ion exchange reaction is provided by the subsequent annealing heat treatment of the glass article.

6. The improvement of claim 2, wherein said glass is a soda-lime-silica glass.

7. The improvement of claim 2, wherein said glass is a soda aluminosilicate glass.

8. The improvement of claim 2, wherein said glass is a soda magnesia silicate glass.

9. A method as defined in claim 1 in which the glass article is a bottle.

References Cited

UNITED STATES PATENTS

| | | | |
|---|---|---|---|
| 2,779,136 | 1/1957 | Hood et al. | 65—30 |
| 2,290,911 | 7/1942 | Jones | 65—30 |

FOREIGN PATENTS 966,734  8/1964  Great Britain.

OTHER REFERENCES

Le Clerc, P., "Diffusion Characteristics of Mobile Ions in a Vitreous Network," Travaux du IV congres International du Verre (Paris, July 2–5, 1956) pp. 331–335.

S. LEON BASHORE, Primary Examiner

J. H. HARMAN, Assistant Examiner

U.S. Cl. X.R.

65—114; 117—124